United States Patent
Watanabe et al.

(10) Patent No.: US 7,363,501 B2
(45) Date of Patent: Apr. 22, 2008

(54) SEMICONDUCTOR INTEGRATED CIRCUIT WITH FUNCTION TO MANAGE LICENSE INFORMATION

(75) Inventors: Atsushi Watanabe, Kawasaki (JP);
Noburu Rinoie, Kawasaki (JP);
Takamitsu Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 760 days.

(21) Appl. No.: 10/046,759

(22) Filed: Jan. 17, 2002

(65) Prior Publication Data

US 2002/0144125 A1    Oct. 3, 2002

(30) Foreign Application Priority Data

Apr. 2, 2001    (JP) ............... 2001-103835

(51) Int. Cl.
*H04K 1/00*    (2006.01)
(52) U.S. Cl. .................. 713/182; 713/189; 705/59
(58) Field of Classification Search ............... 713/189, 713/182; 705/56–59
See application file for complete search history.

(56) References Cited

U.S. PATENT DOCUMENTS

| | | | | |
|---|---|---|---|---|
| 4,291,404 A | * | 9/1981 | Steiner ................. | 714/724 |
| 4,506,148 A | * | 3/1985 | Berthold et al. ........ | 235/380 |
| 4,601,034 A | * | 7/1986 | Sridhar ................. | 714/732 |
| 4,766,516 A | * | 8/1988 | Ozdemir et al. ......... | 361/820 |
| 4,924,378 A | * | 5/1990 | Hershey et al. ......... | 726/29 |
| 4,985,920 A | * | 1/1991 | Seki ..................... | 713/193 |
| 5,027,398 A | * | 6/1991 | Miyoshi ................ | 714/54 |
| 5,034,980 A | * | 7/1991 | Kubota .................. | 713/189 |
| 5,123,045 A | * | 6/1992 | Ostrovsky et al. ....... | 713/190 |
| 5,182,770 A | * | 1/1993 | Medveczky et al. ...... | 705/56 |
| 5,363,380 A | * | 11/1994 | Shinohara ............... | 714/25 |
| 5,761,309 A | * | 6/1998 | Ohashi et al. .......... | 713/156 |
| 5,774,545 A | | 6/1998 | Raghavachari | |
| 5,903,650 A | * | 5/1999 | Ross et al. ............ | 705/59 |
| 6,000,004 A | * | 12/1999 | Fukumoto .............. | 711/103 |
| 6,018,800 A | * | 1/2000 | Ruckdashel ............ | 713/200 |
| 6,032,257 A | * | 2/2000 | Olarig et al. .......... | 713/200 |
| 6,198,669 B1 | * | 3/2001 | Iguchi ................. | 365/189.07 |
| 6,278,654 B1 | * | 8/2001 | Roohparvar ............ | 365/238.5 |
| 6,294,816 B1 | * | 9/2001 | Baukus et al. ......... | 257/368 |
| 6,438,068 B1 | * | 8/2002 | Roohparvar ............ | 365/238.5 |
| 6,510,502 B1 | * | 1/2003 | Shimizu ................ | 711/164 |
| 6,535,016 B2 | * | 3/2003 | Choukalos et al. ...... | 326/8 |
| 6,567,915 B1 | * | 5/2003 | Guthery ................ | 713/168 |
| 6,606,744 B1 | * | 8/2003 | Mikurak ................ | 705/26 |
| 6,629,061 B1 | * | 9/2003 | Shaffer ................ | 702/188 |
| 6,708,273 B1 | * | 3/2004 | Ober et al. ............ | 713/189 |
| 6,763,463 B1 | * | 7/2004 | Guthery ................ | 713/193 |
| 6,772,133 B1 | * | 8/2004 | Kambayashi et al. ..... | 705/57 |
| 6,775,779 B1 | * | 8/2004 | England et al. ........ | 726/26 |

(Continued)

FOREIGN PATENT DOCUMENTS

JP    2000-215108    8/2000

*Primary Examiner*—Nasser Moazzami
*Assistant Examiner*—David Garcia Cervetti
(74) *Attorney, Agent, or Firm*—Arent Fox LLP

(57) ABSTRACT

A semiconductor integrated circuit includes one or more function blocks, a nonvolatile memory unit which stores therein coded license information, and a decoder circuit which decodes the license information stored in the nonvolatile memory unit, and makes one of the function blocks either usable or unusable depending on the decoded license information.

10 Claims, 3 Drawing Sheets

U.S. PATENT DOCUMENTS

| | | | |
|---|---|---|---|
| 6,779,112 B1* | 8/2004 | Guthery | 713/172 |
| 6,779,113 B1* | 8/2004 | Guthery | 713/172 |
| 6,820,063 B1* | 11/2004 | England et al. | 705/54 |
| 6,904,527 B1* | 6/2005 | Parlour et al. | 713/189 |
| 7,200,760 B2* | 4/2007 | Riebe et al. | 713/194 |
| 7,203,842 B2* | 4/2007 | Kean | 713/189 |
| 2001/0037301 A1* | 11/2001 | Shepley et al. | 705/43 |
| 2002/0024884 A1* | 2/2002 | Roohparvar | 365/238.5 |
| 2002/0116339 A1* | 8/2002 | Lin | 705/59 |
| 2002/0199110 A1* | 12/2002 | Kean | 713/189 |
| 2003/0046238 A1* | 3/2003 | Nonaka et al. | 705/51 |
| 2004/0019566 A1* | 1/2004 | Foster et al. | 705/59 |

* cited by examiner

SEMICONDUCTOR INTEGRATED CIRCUIT WITH FUNCTION TO MANAGE LICENSE INFORMATION

BACKGROUND OF THE INVENTION

1. Field of the Invention

The present invention generally relates to semiconductor integrated circuits, and particularly relates to a semiconductor integrated circuit that manages and controls license information.

2. Description of the Related Art

As the circuit density of semiconductor integrated circuits increases, a semiconductor integrated circuit becomes like a single system including a variety of functions, resulting in a need to properly manage and control the legal right to use each of these functions. For example, it becomes necessary to provide a function to permit or deny the use of a particular function block based on license information. When function blocks subject to intellectual property protection are implemented, there may be a need to calculate royalties according to a period of use or the time of use or to make settings to a valid period of use with respect to these function blocks. Further, when a particular function block is used based on a license, additional license may become necessary to expand the function of the block.

In semiconductor integrated circuits, a function to permit or deny the use of particular function blocks based on license information may be implemented by entering license codes at each start-up operation from an exterior of circuitry and storing them in volatile memory. Operations of the function blocks are then controlled based on the license codes. This method requires the proper management of license codes outside the semiconductor integrated circuits. Further, the number of use needs to be kept record of if there is a need to limit the number of use or the like based on license information, and such a record must be kept outside the device as a precaution against a power failure.

Accordingly, there is a need for a semiconductor integrated circuit that can manage and control license information on its own inside its own circuit.

SUMMARY OF THE INVENTION

It is a general object of the present invention to provide a semiconductor integrated circuit that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a semiconductor integrated circuit particularly pointed out in the specification in such full, clear, concise, and exact terms as to enable a person having ordinary skill in the art to practice the invention.

To achieve these and other advantages and in accordance with the purpose of the invention, as embodied and broadly described herein, a semiconductor integrated circuit of the invention includes one or more function blocks, a nonvolatile memory unit which stores therein coded license information, and a decoder circuit which decodes the license information stored in the nonvolatile memory unit, and makes one of the function blocks either usable or unusable depending on the decoded license information.

In the semiconductor integrated circuit as described above, the nonvolatile memory unit comprised of a nonvolatile memory such as an electrically erasable programmable read-only memory ("EEPROM") stores therein the coded license code, and the decoder circuit decodes the license code, thereby making it possible to make each function block either usable or unusable depending on the license code. This eliminates the need to enter license codes each time the circuit is powered on.

In the semiconductor integrated circuit as described above, the nonvolatile memory unit comprised of a nonvolatile memory such as an EEPROM stores therein the coded license code, and the decoder circuit decodes the license code, thereby making it possible to make each function block either usable or unusable depending on the license code. This eliminates the need to enter license codes each time the circuit is powered on.

According to another aspect of the present invention, the semiconductor integrated circuit as described above further includes a status unit that has at least part of the decoded license information stored therein in such a manner as to be accessible from an exterior of the semiconductor integrated circuit.

Since the decoded license code information decoded by the decoder circuit is stored in such a manner as to be accessible from the exterior as status information, the status information about the license can be supplied to the exterior of the semiconductor integrated circuit in response to a user request.

According to another aspect of the present invention, the semiconductor integrated circuit as described above further includes a calendar circuit which indicates a current date and time, wherein the decoder circuit makes the one of the function blocks usable in response to a finding that the current date and time indicated by the calendar circuit is within a valid period indicated by the decoded license information, and makes the one of the function blocks unusable in response to a finding that the current date and time indicated by the calendar circuit is after a valid period indicated by the decoded license information.

In the semiconductor integrated circuit as described above, the calendar circuit indicating the current date and time is provided, so that a valid period can be managed and controlled based on the license information.

According to another aspect of the present invention, the semiconductor integrated circuit as described above further includes a counter circuit that counts a number indicative of how many times the one of the function blocks is used, wherein the decoder circuit makes the one of the function blocks usable in response to a finding that the number counted by the counter circuit is within a number of valid use indicated by the decoded license information, and makes the one of the function blocks unusable in response to a finding that the number counted by the counter circuit exceeds the number of valid use indicated by the decoded license information.

In the semiconductor integrated circuit as described above, the counter circuit counting the number of use of a function block is provided, so that the number of valid use can be managed and controlled based on the license information.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
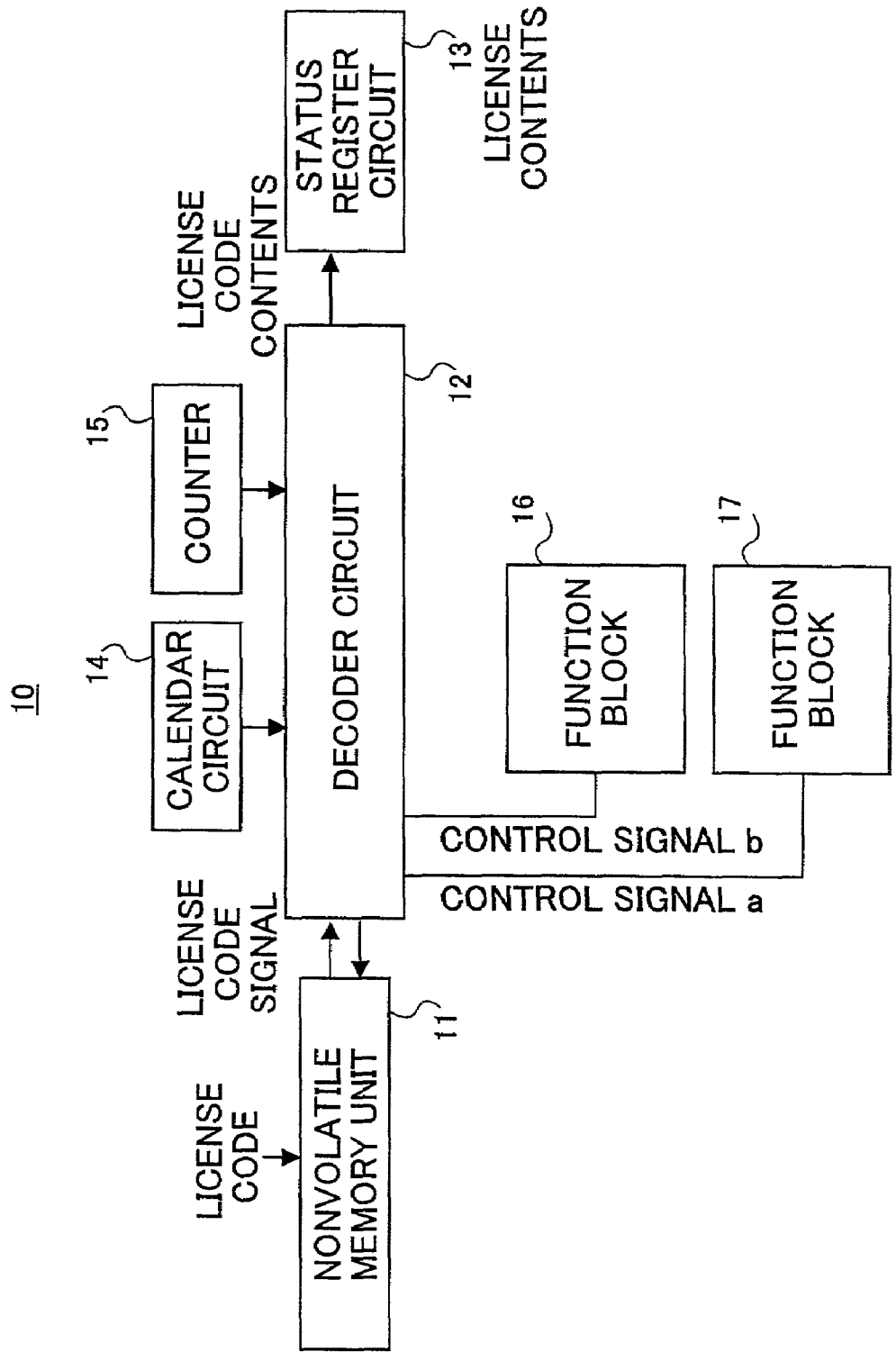
FIG. 1 is a block diagram of an embodiment of a semiconductor integrated circuit according to the present invention.

FIG. 1 is a block diagram of an embodiment of a semiconductor integrated circuit according to the present invention.

The semiconductor integrated circuit 10 of FIG. 1 includes a nonvolatile memory unit 11, a decoder circuit 12, a status register circuit 13, a calendar circuit 14, a counter 15, a function block 16, and a function block 17.

The nonvolatile memory unit 11 is comprised of a nonvolatile memory, and stores license information about each function block. The decoder circuit 12 decodes the license information stored in the nonvolatile memory unit 11, and controls an operation of each of the function blocks 16 and 17 based on the decoded results as to whether its operation is valid or invalid. The calendar circuit 14 provides data of a date and time that is used to check whether the valid license period is expired. The counter 15 counts the number of use with respect to each function block, and provides data regarding the number of use. The status register circuit 13 receives the decoded results by the decoder circuit 12, and stores therein status information of the semiconductor integrated circuit 10 about licenses.

Operations of the semiconductor integrated circuit 10 will be described in detail in the following.

The nonvolatile memory unit 11 is comprised of EEPROM or the like, and stores license codes provided from an exterior of the semiconductor integrated circuit 10. These license codes each include information indicative of operation/suspension of a function block, a valid period of a function block, information about the number of use of a function block, etc. The license codes are stored in memory after encoding (encryption) for the purpose of preventing illegal copying or tampering.

The decoder circuit 12 decodes license codes received from the nonvolatile memory unit 11. Based on the decoded results, together with information from the calendar circuit 14 and the counter 15, the decoder circuit 12 determines whether the function blocks 16 and 17 are valid or invalid. According to the determination of validity or invalidity of the function blocks 16 and 17, the decoder circuit 12 outputs control signals b and a to the function blocks 16 and 17, respectively. The control signals b and a may be chip enable signals or the like to the function blocks 16 and 17, respectively. These signals, however, are not limited to particular signals, and can be any signals as long as they can control the operation of function blocks.

The decoder circuit 12 stores the count numbers of use of each function block in the nonvolatile memory unit 11 as these numbers are counted by the counter 15. This is done in order to prevent the information about the number of use of each function block counted by the counter 15 from being lost at the time of power failure.

The information about the license codes decoded by the decoder circuit 12 is stored in the status register circuit 13 as information indicative of the status of the semiconductor integrated circuit 10. The license codes stored in the nonvolatile memory unit 11 are given in an encoded (encrypted) format so as to prevent illegal copying, so that reading the contents of the nonvolatile memory unit 11 does not give a clue to the details of the licenses. The status register circuit 13 stores therein the information about the license codes decoded by the decoder circuit 12 as license status information indicative of the status of the semiconductor integrated circuit 10, and outputs the license status information to the exterior of the semiconductor integrated circuit 10 in response to a user request.

As described above, the semiconductor integrated circuit 10 according to the present invention stores encrypted license codes in the nonvolatile memory unit 11 comprised of a nonvolatile memory such as an EEPROM, and uses the decoder circuit 12 to decode the license codes, thereby controlling the operation/suspension of each function block according to the license codes. Further, the information about the license codes decoded by the decoder circuit 12 is stored in the status register circuit 13 as the license status information, so that the status information about the licenses can be supplied to the exterior of the semiconductor integrated circuit 10 in response to a user request.

A means of encryption used in the present invention may be any one of encryption schemes conventionally used in various arts, and is not limited to a particular scheme.

Figure 2:
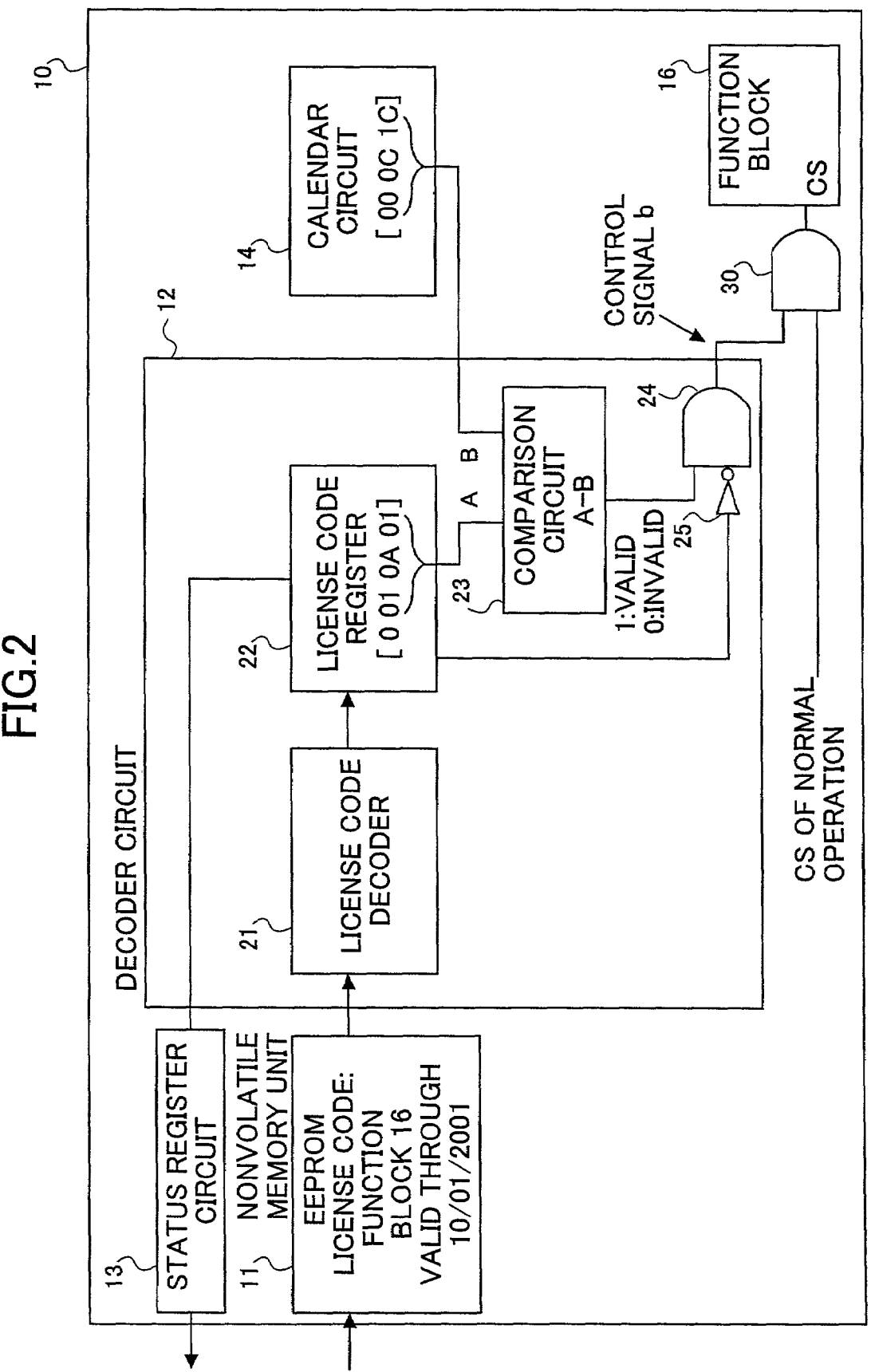
FIG. 2 is a block diagram of a portion of the semiconductor integrated circuit that relates to the management and control of a valid period.

FIG. 2 is a block diagram of a portion of the semiconductor integrated circuit 10 that relates to the management and control of a valid period.

In FIG. 2, the decoder circuit 12 includes a license code decoder 21, a license code register 22, a comparison circuit 23, an AND circuit 24, and an inverter 25.

A license code indicating that the function block 16 is valid through Oct. 1, 2001, for example, is entered from the exterior of the semiconductor integrated circuit 10, and is stored in the nonvolatile memory unit 11 comprised of EEPROM. This license code is provided in an encrypted format. Even if a user accesses the nonvolatile memory unit 11, the user cannot learn the details of the license. Without the knowledge of the employed encryption scheme, the user cannot write an illegal license code.

The license code decoder 21 receives the license code from the nonvolatile memory unit 11, and decodes it according to predetermined rules. The decoded license code is supplied to and stored in the license code register 22.

The decoded license code stored in the license code register 22 is "0010A01", for example, as shown in FIG. 2. The most significant bit "0" indicates the first function block among a plurality of function blocks, which is the function block 16 in this example. The next two bytes "01" indicate "year 2001", and the following "0A" represents "October". The last two bytes "01" refers to the first day of a given month. In this manner, this license code indicates that the function block 16 is valid through Oct. 1, 2001. In this case, the use of the function block 16 is permitted until Oct. 1, 2001, but will not be allowed thereafter unless the license is extended or a new license is purchased.

As shown in FIG. 2, the calendar circuit 14 shows a current date "Dec. 28, 2000" as "0000C1C". The first two bytes "00" indicates the year 2000, and the following "0C" represents "October". The last two bytes "1C" points to the twenty-eighth day of a given month.

The comparison circuit 23 of the decoder circuit 12 receives "010A01" indicative of the valid period from the license code register 22, and receives "000C1C" indicative of a current date from the calendar circuit 14. The comparison circuit 23 compares the expiration date with the current date by subtracting "000C1C" from "010A01", for example. If the subtraction results in a positive number, the license is valid, so that the comparison circuit 23 outputs a value "1" indicative of a valid status. If the subtraction produces a negative number, it is ascertained that the license has been expired, so that the comparison circuit 23 outputs a value "0" indicative of an invalid status.

The output of the comparison circuit 23 is supplied to one input of the AND circuit 24. The other input of the AND circuit 24 receives an output of the inverter 25. The inverter 25 receives the most significant bit "0" of the decoded license code "0010A01", and outputs "1" when the license code is directed to the first function block that is the function block 16 in this example.

If the license code is directed to the second function block that is the function block 17 in this example, the most significant bit of the license code is "1", which results in the output of the inverter 25 being "0". Although not shown in FIG. 2, a control circuit for the function block 17 may be configured such that an additional AND circuit is provided in parallel to the AND circuit 24, and the output of the comparison circuit 23 is supplied to one input of the additional AND circuit with the most significant bit of the license code being supplied directly to the other input thereof without an intervening inverter.

The AND circuit 24 outputs "1" as the control signal b for the function block 16 when the comparison circuit 23 outputs "1" indicative of the valid state, and the license code points to the function block 16.

The semiconductor integrated circuit 10 further includes an AND circuit 30. The AND circuit 30 receives a chip select signal CS and the control signal b that is supplied from the decoder circuit 12 (i.e., from the AND circuit 24). The chip select signal CS serves to select the function block 16 during routine and normal operations regardless of the license information. When both the chip select signal CS and the control signal b are "1", the AND circuit 30 supplies "1" to the function block 16 as an activated chip select signal CS. In this manner, the decoder circuit 12 generates a control signal that activates the function block 16 as a valid block if the license code provides a valid period for the function block 16 and if the date of expiration of this period is later than the current date indicated by the calendar circuit 14.

Data "0010A01" of the valid period stored in the license code register 22 is stored in the status register circuit 13 by the decoder circuit 12. By reading the data contents of the status register circuit 13 from an exterior of the semiconductor integrated circuit 10, the user can learn the details of license information that is currently used.

Figure 3:
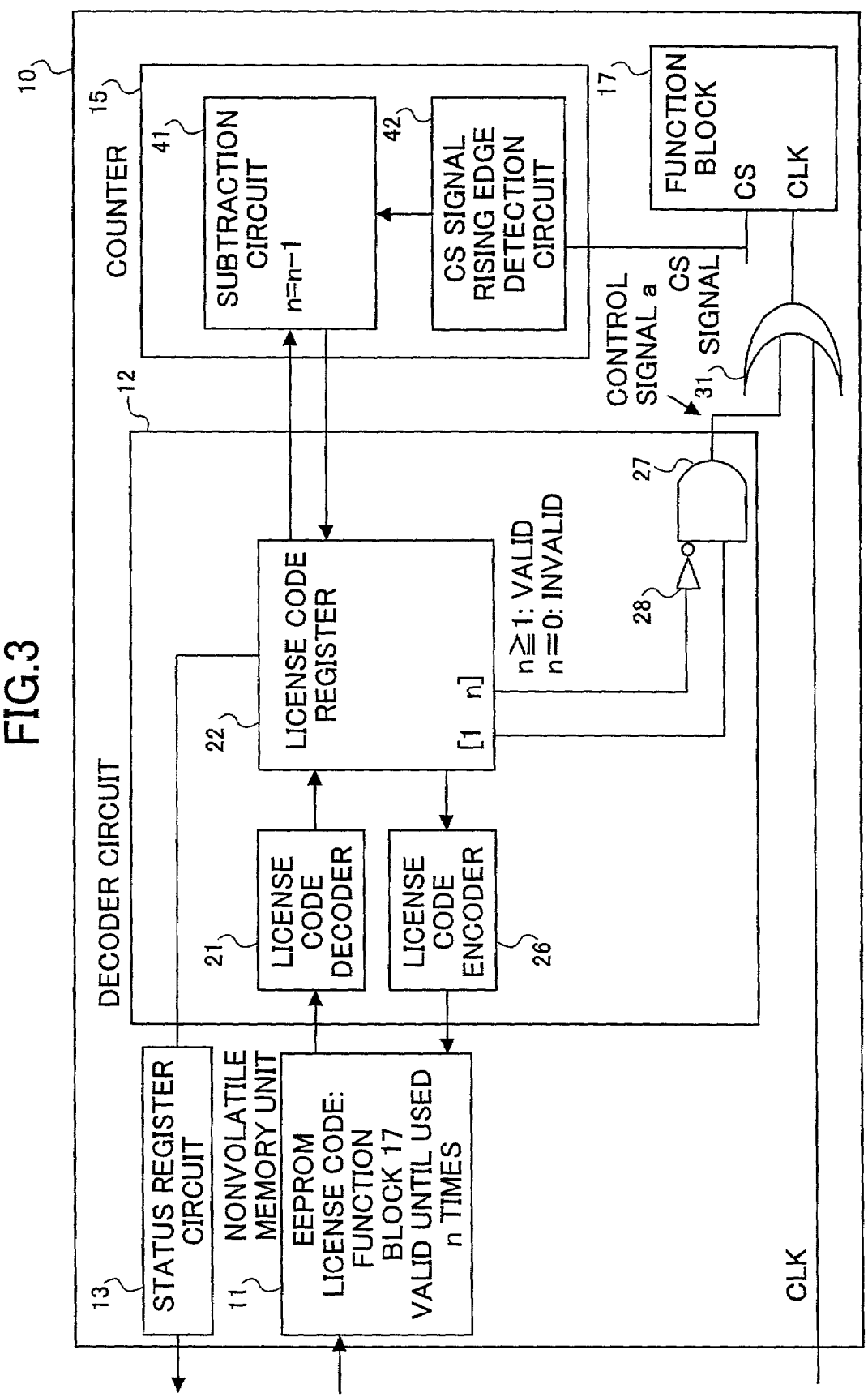
FIG. 3 is a block diagram showing a portion relevant to the management of the number of valid use in the semiconductor integrated circuit.

FIG. 3 is a block diagram showing a portion relevant to the management of the number of valid use in the semiconductor integrated circuit 10.

In FIG. 3, the decoder circuit 12 includes the license code decoder 21, the license code register 22, a license encoder 26, an AND circuit 27, and an inverter 28.

A license code indicating that the number of valid use of the function block 17 is n, for example, is entered from the exterior of the semiconductor integrated circuit 10, and is stored in the nonvolatile memory unit 11 comprised of EEPROM. For example, such license information may be written into the semiconductor integrated circuit 10 by use of large scale integrated circuit ("LSI") tester or the like at the time of shipping out from the factory. If this is the way it is done, there is no need to provide the package of the semiconductor integrated circuit with external pins for the purpose of writing license codes.

The license code is provided in an encrypted format. Even if a user accesses the nonvolatile memory unit 11, the user cannot learn the details of the license. Without the knowledge of the employed encryption scheme, the user cannot write an illegal license code.

The license code decoder 21 receives the license code from the nonvolatile memory unit 11, and decodes (decrypts) it according to predetermined rules. The decoded license code is supplied to and stored in the license code register 22.

The decoded license code stored in the license code register 22 may be "1n", for example, as shown in FIG. 3. The most significant bit "1" indicates the second function block among a plurality of function blocks, which is the function block 17 in this case. The next bits "n" represent the number of times that the function block 17 can be used. Namely, this license code indicates that the function block 17 can be used only n times or less. In this case, the use of the function block 17 is permitted until it is used n times, but will not be allowed thereafter unless the license is extended or a new license is purchased.

The number of use of the function block 17 may be kept record of by counting how many times the chip enable signal CS is asserted to the function block 17. The counter 15 includes a subtraction circuit 41 and a CS signal rising edge detection circuit 42 in order to count the number of occurrences of assertion of the chip enable signal CS.

The CS signal rising edge detection circuit 42 detects a rising edge of the chip enable signal CS when the chip enable signal CS supplied to the function block 17 is activated, and supplies a rising edge detection signal to the subtraction circuit 41. Each time the rising edge detection signal is supplied from the CS signal rising edge detection circuit 42, the subtraction circuit 41 subtracts "1" from the number of valid use stored in the license code register 22, thereby updating the number of valid use with the subtracted number.

The license encoder 26 encodes (encrypts) the license code stored in the license code register 22 when the number of valid use stored in the license code register 22 is updated, and writes the decoded value in the nonvolatile memory unit 11. This insures that the nonvolatile memory unit 11 maintains the license code indicative of the correct number of use even if the semiconductor integrated circuit 10 suffers a power failure.

If the number of valid use stored in the license code register 22 is more than 0, the license code register 22 supplies a HIGH signal to the inverter 28. In response, the inverter 28 outputs "0", so that the output of the AND circuit 27 is "0" at all times. In this case, an output of an OR circuit 31 supplied to a clock input terminal of the function block 17 is a clock signal CLK supplied from an exterior of the semiconductor integrated circuit 10. The function block 17 thus operates properly.

As the number of valid use stored in the license code register 22 becomes zero, the license code register 22 supplies a LOW signal to the inverter 28. In response, the inverter 28 outputs "1" (HIGH), which is supplied to one input of the AND circuit 27. The other input of the AND circuit 27 receives the most significant bit "1" of the decoded license code "1n", which indicates that this license code is directed to the second function block 17.

The AND circuit 27 outputs "1" as the control signal a for the function block 17 if the number of valid use in the license code register 22 is zero and if the license code points to the function block 17.

Since the OR circuit 31 receives the control signal a of "1" at one input thereof, the output of the OR circuit 31 is fixed to "1" (HIGH) regardless of a HIGH/LOW state of the clock signal CLK supplied to the other input thereof.

Accordingly, the function block 17 operating based on the clock signal CLK does not operate any longer when the number of use exceeds the number permitted by the license.

If the license code is directed to the first function block that is the function block 16 in this example, the most significant bit of the license code is "0", which results in the output of the AND circuit 27 being fixed to "0". Although not shown in FIG. 3, a control circuit for the function block 16 may be configured such that an additional AND circuit is provided in parallel to the AND circuit 27, and the output of the inverter 28 is supplied to one input of the additional AND circuit with an inverse of the most significant bit of the license code being supplied to the other input thereof.

Information "1n" about the number of valid use stored in the license code register 22 is stored in the status register circuit 13 by the decoder circuit 12. By reading the data contents of the status register circuit 13 from an exterior of the semiconductor integrated circuit 10, the user can learn the details of license information that is currently used.

If the license code indicative of the number of valid use is entered again and written in the nonvolatile memory unit 11, unlimited illegal use becomes possible. To prevent this, once a code is stored in the nonvolatile memory unit 11, the original code may be kept inside separately from the code that continues to be updated. Provision can then be made such that the license code decoder 21 insures that the same code cannot be used more than twice.

In the embodiment described above, the clock signal CLK is regarded as a signal that is essential for the operation of the function block 17, and the supply of the clock signal CLK is controlled based on the license information to switch the permission/denial of use of the function block 17. This is only an example. In the same manner as in FIG. 2, for example, the chip enable signal CS may be controlled to switch the permission/denial of use of the function block 17. Further, the configuration described above counts the rising edges of the chip enable signal CS for the purpose of counting the number of use of the function block 17. Alternatively, a power-on signal, a reset signal, or the like may be counted to achieve the same results. The present invention is not limited to any particular configuration in terms of how to count the number of use of function blocks.

Further, the present invention is not limited to these embodiments, but various variations and modifications may be made without departing from the scope of the present invention.

The present application is based on Japanese priority application No. 2001-103835 filed on Apr. 2, 2001, with the Japanese Patent Office, the entire contents of which are hereby incorporated by reference.

What is claimed is:

1. A semiconductor integrated circuit, comprising:
   a plurality of internal hardware function blocks provided inside the semiconductor integrated circuit;
   a nonvolatile memory unit which stores therein coded license information indicative of a usable/unusable status separately for each of the plurality of internal hardware function blocks; and
   a decoder circuit which decodes the license information stored in said nonvolatile memory unit, and makes each of the internal hardware function blocks separately either usable or unusable depending on the decoded license information in response to information that is kept inside the semiconductor integrated circuit and indicates at least one of a current date and time and a number indicative of how many times one of the function blocks is used.

2. The semiconductor integrated circuit as claimed in claim 1, further comprising a status unit that has at least part of the decoded license information stored therein in such a manner as to be accessible from an exterior of said semiconductor integrated circuit.

3. The semiconductor integrated circuit as claimed in claim 1, further comprising a calendar circuit which indicates a current date and time, wherein said decoder circuit makes said plurality of hardware function blocks usable in response to a finding that the current date and time indicated by the calendar circuit is within a valid period indicated by the decoded license information, and makes said plurality of hardware function blocks unusable in response to a finding that the current date and time indicated by the calendar circuit is after a valid period indicated by the decoded license information.

4. The semiconductor integrated circuit as claimed in claim 1, further comprising a counter circuit that counts a number indicative of how many times said plurality of hardware function blocks are used, wherein said decoder circuit makes said plurality of hardware function blocks usable in response to a finding that the number counted by said counter circuit is within a number of valid use indicated by the decoded license information, and makes said plurality of hardware function blocks unusable in response to a finding that the number counted by said counter circuit exceeds the number of valid use indicated by the decoded license information.

5. The semiconductor integrated circuit as claimed in claim 4, further comprising a license encoder circuit which encodes the number counted by said counter circuit, wherein the number encoded by said license encoder circuit is stored in said nonvolatile memory unit as updated license information.

6. The semiconductor integrated circuit as claimed in claim 1, wherein coding and decoding of the license information is encrypting and decrypting that prevent the license information in said nonvolatile memory unit from being illegally rewritten.

7. The semiconductor integrated circuit as claimed in claim 1, wherein said decoder circuit includes:
   a decoder which decodes the license information stored in said nonvolatile memory unit;
   a license register which stores therein the decoded license information decoded by said decoder; and
   a control circuit which makes said plurality of hardware function blocks either usable or unusable depending on the information stored in said license register.

8. The semiconductor integrated circuit as claimed in claim 7, wherein said control circuit controls a chip enable signal of said plurality of hardware function blocks in order to make said plurality of hardware function blocks either usable or unusable.

9. The semiconductor integrated circuit as claimed in claim 7, wherein said control circuit controls a clock signal of said plurality of hardware function blocks in order to make said plurality of hardware function blocks either usable or unusable.

10. The semiconductor integrated circuit as claimed in claim 1, wherein said nonvolatile memory unit receives the coded license information from an external large scale integration (LSI) tester, and no external pin is provided for a purpose of receiving the coded license information.

* * * * *